Figure 1:
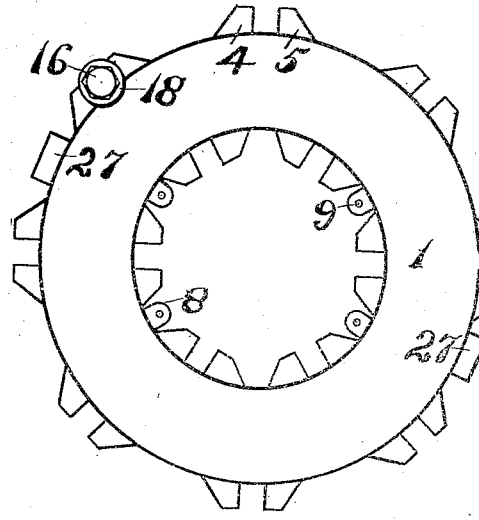

J. K. WILLIAMS.
VULCANIZING MOLD.
APPLICATION FILED JAN. 20, 1908.

908,181.

Patented Dec. 29, 1908.

Witnesses:
Glenara Fox
A. E. Kling

Inventor—
John K. Williams
By C. E. Humphrey,
Attorney

UNITED STATES PATENT OFFICE.

JOHN K. WILLIAMS, OF AKRON, OHIO, ASSIGNOR OF ONE-HALF TO THE WILLIAMS FOUNDRY AND MACHINE COMPANY, OF AKRON, OHIO, A CORPORATION OF OHIO.

VULCANIZING-MOLD.

No. 908,181.  Specification of Letters Patent.  Patented Dec. 29, 1908.

Application filed January 20, 1908. Serial No. 411,651.

*To all whom it may concern:*

Be it known that I, JOHN K. WILLIAMS, a citizen of the United States, residing at Akron, in the county of Summit and State of Ohio, have invented new and useful Improvements in Vulcanizing-Molds, of which the following is a specification.

This invention relates to molds for containing articles, more especially vehicle tires wholly or in part composed of rubber, during the vulcanization thereof, and an object thereof is to produce a mold provided with a plurality of parts, said parts comprising end and intermediate sections, said end sections being each formed with grooves in one of the faces thereof so constructed that when the two of them are clamped together they will constitute a complete mold, said intermediate sections being so formed that any number thereof may be interposed between two end sections, each intermediate section being provided with grooves on their opposite faces so that when the intermediate sections are in abutting relation with each other or with one of the end sections they will form therewith complete molds, whereby the capacity of the device may be extended indefinitely within reasonable limits by the interposition of the intermediate sections between suitable end or closing sections.

From the foregoing it will be seen that by the employment of a pair of suitable end sections for closing the top and the bottom of the mold, said sections being provided with grooves in one face thereof, any number of units comprising intermediate sections may be placed between said end sections for increasing the capacity of the device, each intermediate section, as before stated, having in its opposite faces grooves forming one-half of a mold cavity of a proper shape and size to vulcanize the article to be introduced therein.

Further objects of this invention is to form the sections with means whereby they may be brought into and separated from abutting relation with each other to form when united an integral article and further provided with means for securely clamping them together.

Further objects of this invention is to so construct the sections that the thickness of the metal surrounding the cavities of the molds will be approximately equal in all directions to the end that the heat required to vulcanize the article may radiate to all parts of the mold cavities approximately equally so that all portions of the tire will be cured in substantially the same length of time which would not be true if portions of the metal differed in thickness, for the reason that the portions of the article adjacent the thickened portions of the mold would not receive as intense a heat as would those portions which were adjacent the thinner walls of the mold.

Other advantages constituting objects of this invention will more fully appear in the subjoined description.

A practical embodiment of this invention is illustrated in the accompanying drawings in which similar reference numerals indicate like parts in the different figures.

Figure 2:
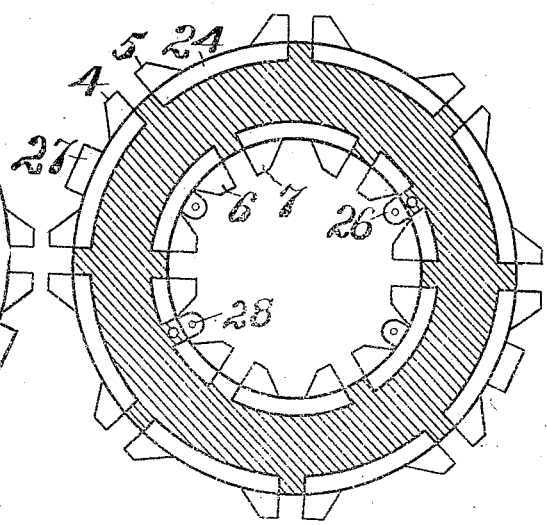
Figure 3:
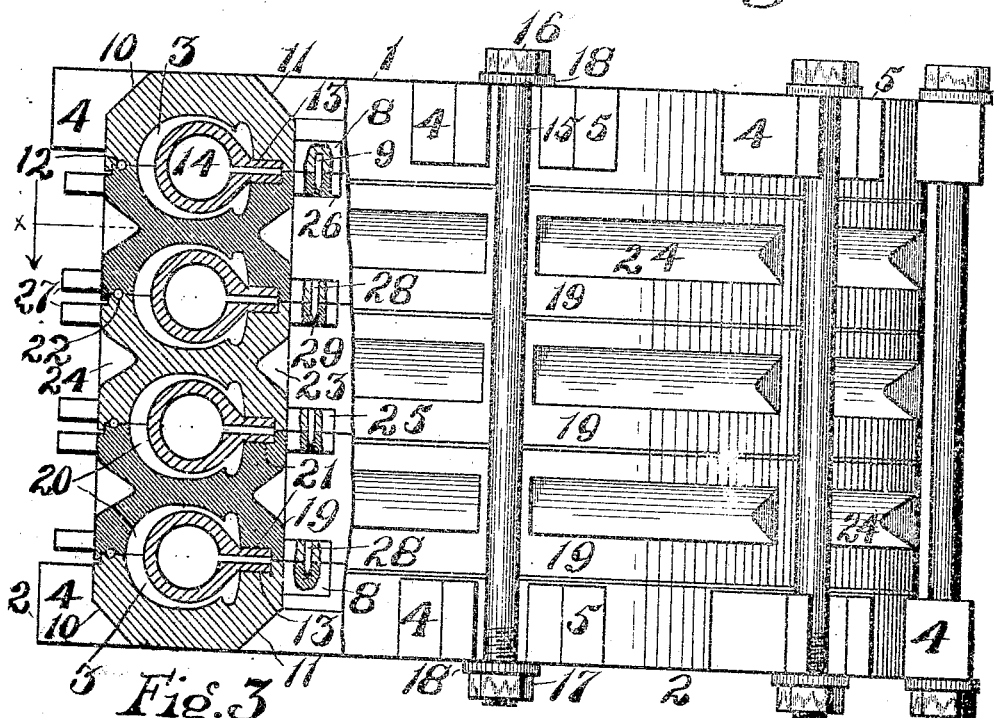

Referring to the drawings Figure 1 is a plan view of a mold formed in accordance with this invention. Fig. 2 is a sectional view of a mold such as is shown in Fig. 1 on line X of Fig. 3, and, Fig. 3 is a view in side elevation, enlarged, of the mold shown in Fig. 1 with portions thereof broken away to better illustrate the interior construction thereof.

Referring to the drawings in detail, 1 and 2 denote the top and bottom mold sections respectively. These sections are identical and consist of metallic rings each having in one face an annular groove 3 of a shape which it is desired to impart to the vulcanized article. These sections are provided with an outwardly-extending series of pairs of individual lugs, the members of each pair being referred to by the numerals 4 and 5. The members 1 and 2 are further provided interiorly with a second series of inwardly-projecting pairs of lugs, the members thereof referred to by the numerals 6 and 7. The series of lugs 4 and 5 may or may not register with the series of lugs 6 and 7, but the pairs of each series of lugs on the member 1 will be in vertical alinement with the corresponding series of lugs on the member 2. The members 1 and 2 are further provided interiorly with a third set of inwardly-extending lugs, designated in the drawings by the reference numeral 8 and each of the members of this latter series of lugs is provided with either a dowel pin 9 or opening to receive a dowel pin.

In order to make the walls of the members 1 and 2 which surround the grooves 3 thinner, the outer faces of these members are beveled as at 10 and 11 for a purpose to be hereinafter described. The inner or abutting faces of the members 1 and 2 are further provided with grooves 12 surrounding but spaced apart from the grooves 3, for a purpose to be later described.

If it is desired to vulcanize an article which requires the use of a core for making the interior of the rubber article hollow, suitable grooves 13 are cut in the inner or abutting faces of the members 1 and 2 which when the molds are united form a suitable cavity for the reception of the stem of a core 14 and thereby effectually secure the latter in position.

When it is desired to utilize this device as a single cavity mold, some article, as for example, a rubber tire, which has been built up in an unvulcanized condition on core 14 is laid in the groove 3 of the member 2 with the stem of the core extending into the groove 13. The member 1 is then superposed on the member 2 in such a manner that the dowel pin 9 on the lug 8 of the member 1 will enter a registering opening in the lug 8 of the member 2 thereby positioning the member 1 with respect to the member 2. The two members 1 and 2 are then clamped together by means of bolts 15 provided with heads 16, nuts 17 and washers 18. These bolts are of such a length as to be capable of being inserted between the members 4 and 5 of the series of lugs projecting from the outer periphery of the mold members 1 and 2 as well as between the members 6 and 7 of each pair of lugs projecting interiorly from these members and by the use of the washers 18 which extend laterally sufficiently to engage and lap these lugs, the two members 1 and 2 are clamped together in the action of drawing up the nuts 17. The mold thus set up is then placed in a vulcanizing heat until the articles contained in the mold cavities have been properly cured after which the bolts are released, the members separated and the vulcanized article removed from the mold.

In order to make this device capable of vulcanizing a plurality of articles simultaneously, I employ intermediate sections 19 designed to be interposed between the sections 1 and 2. These sections 19 are rings formed with grooves 20 in their opposite faces similar to the grooves 3 in the faces of the sections 1 and 2 and are adapted to register therewith. They are also provided with suitable registering grooves 21 to receive the stems of the cores in a similar manner to the grooves 13 of the sections 1 and 2 and have semi-circular grooves 22 to register with and form openings in connection with the semi-circular grooves 12 of the sections 1 and 2. The inner and outer faces of these intermediate sections are provided with circumferentially-formed grooves 23 and 24 for a purpose to be later described. Each section 19 is provided with two circumferentially-arranged series of lugs 25 and 26 one series of which is provided with projecting dowel pins 28 and the other with openings 29 to receive the pins of an adjacent section whereby the sections may be positioned. Each of the sections 19 is further provided with one or more series of outwardly-extending lugs 27 so arranged that the members of each pair will be nearly opposite the top and bottom faces of the members, for a purpose to be described.

In setting up a mold such as is illustrated in Fig. 3 of the drawings, the end section 2 will be placed on some suitable support, and an article, such as a tire provided with a core, will be laid in the groove 3. The first intermediate section 19 will then be superposed on the section 2 and positioned by its dowel pin 28 entering the dowel pin opening in the lug 8 of the member 2, thus causing the groove 21 to register with the groove 13; the groove 20 with the groove 3 and the groove 22 with the groove 12. The groove 20 in the upper face of the section 19 is then properly filled. A second section 19 is then superposed on the first section 19 and positioned in the same manner as the first section and this building up of intermediate sections 19 is carried on indefinitely. When a sufficient number of sections have been nested the top or end section 1 is placed on the upper section 19 and positioned with respect thereto by means of the dowel pins 9 thereof entering the opening 29 in the lugs 26 of the last or top-most intermediate section. The entire nest of molds is then clamped together by means of bolts 15 as has already been described with reference to a single cavity mold.

The openings formed by the registering grooves 12 of the sections 1 and 2 and 22 of the section 19 constitute overflow openings into which surplus material caused by the expansion of the rubber under heat is permitted to escape to relieve undue pressure on the device, but as this is common in the art a further description thereof is believed to be unnecessary.

After vulcanization the bolts 15 are released, the end section 1 lifted off and the tire removed.

In order to remove the intermediate sections and separate them one from the other, experience has shown that it is necessary to employ a bar which is inserted between the members of the series of lugs 27 on adjacent sections for the purpose of prying the sections apart and these lugs 27 are therefore formed on the exterior of the mold sections for this purpose. The removal of the sections one from the other and the tires from the cavities on adjacent sections is carried on until the mold is empty.

By forming the intermediate sections with the grooves 23 and 24 as well as beveling the end sections causes the thickness of metal which surrounds each of the mold cavities to be nearly uniform thereby permitting the vulcanizing agent, which is usually steam, to act approximately uniformly on the articles contained in the cavities of the mold. This uniform heating of all portions of the tire substantially equally and simultaneously renders the use of this device extremely economical, for the reason that it will not be necessary to extend the time which the tire occupies in the vulcanizing heat an extra length of time due to some portion of the tire not being reached effectively by the heating medium and this uniformity of the action of the vulcanizing agent, due to the peculiar construction of the device, also prevents over-curing certain portions of the articles which would be more exposed to its action by reason of the thinness of the metal surrounding it than would some other portion which was protected or inclosed by a heavier wall of the mold section. It will therefore be seen that the formation of the grooves and beveling of the end of the sections become an extremely important element of this invention for reasons already given by which satisfactory results can be accomplished when a device constructed in accordance with this invention is employed.

What I claim, is:—

1. A vulcanizing mold comprising a pair of annular end sections having grooves in their opposing faces, and an intermediate section adapted to be interposed between said end sections, said intermediate section having annular grooves in its opposite faces registering with the grooves in the faces of said end sections for forming mold cavities, said intermediate section provided with circumferential grooves in the outer and inner faces thereof, substantially as shown and described and for the purpose set forth.

2. A vulcanizing mold comprising a pair of annular end sections having grooves in their opposing faces arranged to coöperate for forming mold cavities, each of said sections further provided with grooves arranged to form, when said sections are in abutting relation, means for sustaining a core, and an intermediate section arranged to be interposed between said end sections, said intermediate section having a plurality of grooves in its opposite faces registering with the grooves in the faces of said end sections, said intermediate section further provided with circumferential grooves in the outer and inner faces thereof, substantially as shown and described and for the purpose set forth.

3. A vulcanizing mold comprising a pair of annular end sections having grooves in their opposing faces each provided with a series of laterally-extending pairs of lugs, an intermediate section arranged to be clamped between said end sections by means engaging said pairs of lugs, said intermediate section having grooves on their opposite faces registering with the grooves in the faces of said end sections, said intermediate section further provided with circumferential grooves in the outer and inner faces thereof, substantially as shown and described and for the purpose set forth.

4. A vulcanizing mold comprising a pair of annular end sections having grooves in their opposing faces normally arranged to register and provided with a series of laterally-extending pairs of lugs, an intermediate section arranged to be interposed between said end sections, said intermediate section having grooves arranged to coöperate with the grooves in the faces of said end sections, said intermediate section further provided with circumferential grooves in the outer and inner faces thereof, and bolts engaging said lugs for clamping said sections together, substantially as shown and described and for the purpose set forth.

5. A vulcanizing mold comprising a pair of annular end sections having registering cavity-forming grooves in their opposing faces, a plurality of intermediate sections interposed between said end sections, each of said intermediate sections having grooves in their opposite faces adapted to register with the grooves in adjacent sections and with the grooves in said end sections, said intermediate sections further provided with circumferential grooves in the outer and inner faces thereof, and means for positioning said sections, substantially as shown and described and for the purpose set forth.

6. A vulcanizing mold comprising a pair of annular end sections having grooves in their opposing faces adapted to coöperate to form mold cavities, a plurality of intermediate sections adapted to be interposed between said end sections, each of said intermediate sections having grooves in their opposite faces registering with the grooves in adjacent sections and with the grooves in said end sections, said intermediate sections provided with circumferential grooves in their outer and inner faces, each of said intermediate sections further provided with laterally-extending lugs, the lugs of each section being spaced apart from the lugs of adjacent sections to permit of the insertion of a separating tool therebetween, substantially as shown and described and for the purpose set forth.

7. A vulcanizing mold comprising a pair of annular end sections having grooves in their opposing faces adapted to coöperate to form mold cavities, a plurality of intermediate sections adapted to be interposed between said end sections, each of said intermediate sections having grooves in their opposite faces registering with the grooves in adjacent sections and with the grooves in said end sections, said intermediate sections provided with circumferential grooves in their outer and inner faces, each of said intermediate sections further provided with laterally-extending lugs, the lugs of each section being spaced apart from the lugs of adjacent sections to permit of the insertion of a separating tool therebetween, all of said sections further provided with means for positioning them, substantially as shown and described and for the purpose set forth.

8. A vulcanizing mold comprising a pair of annular end sections having grooves in their opposing faces and an intermediate section adapted to be interposed between said end sections, said intermediate section having annular grooves in its opposite faces registering with the grooves in the faces of said end sections for forming mold cavities, said intermediate section provided with a circumferential groove in its outer face, substantially as shown and described and for the purpose set forth.

9. A vulcanizing mold comprising a pair of annular end sections having grooves in their opposing faces and an intermediate section adapted to be interposed between said end sections, said intermediate section having annular grooves in its opposite faces registering with the grooves in the faces of said end sections for forming mold cavities, said intermediate section provided with a circumferential groove in its inner face, substantially as shown and described and for the purpose set forth.

In testimony whereof I have hereunto set my hand in presence of two subscribing witnesses.

JOHN K. WILLIAMS.

Witnesses:
C. E. HUMPHREY,
GLENARA FOX.